UNITED STATES PATENT OFFICE.

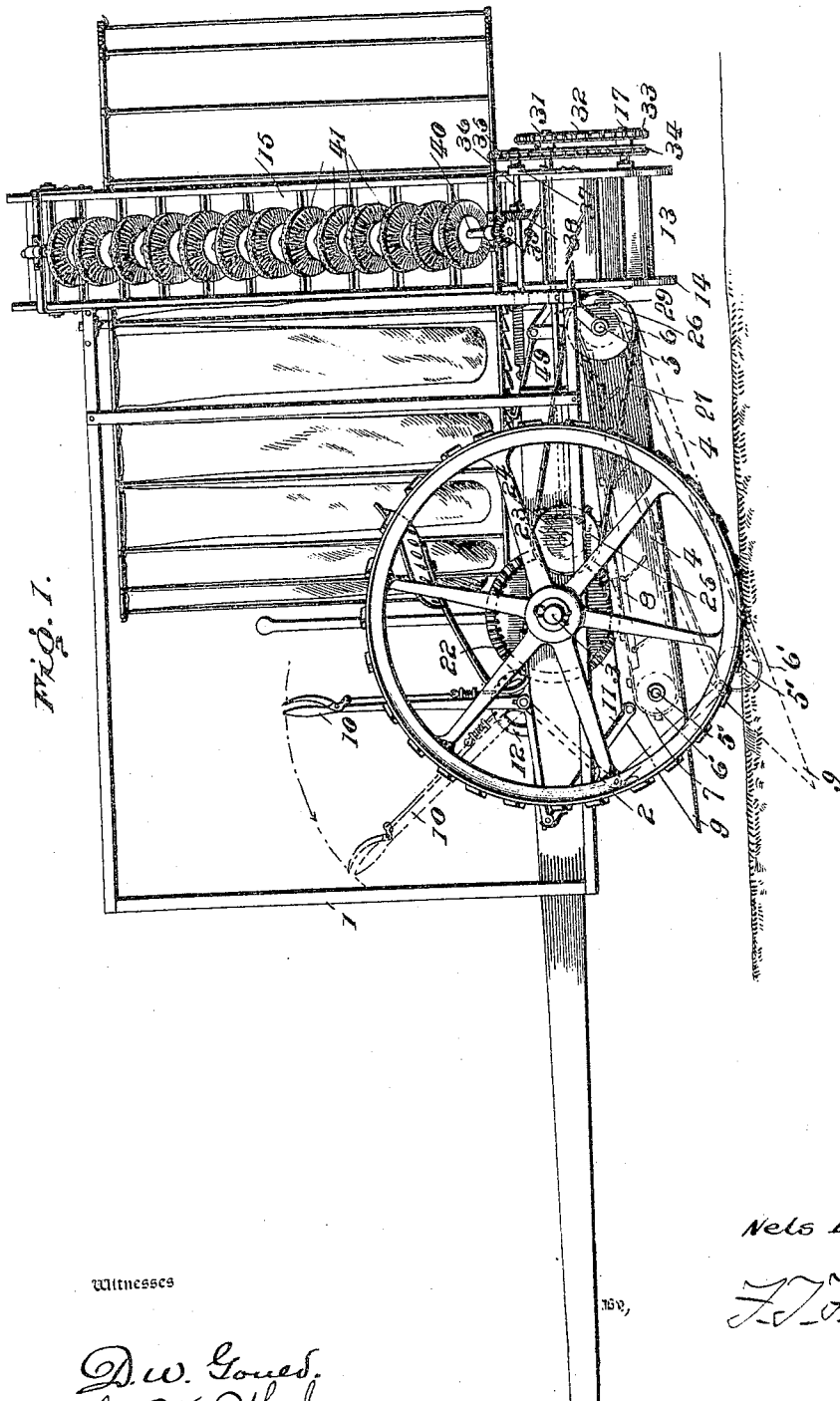

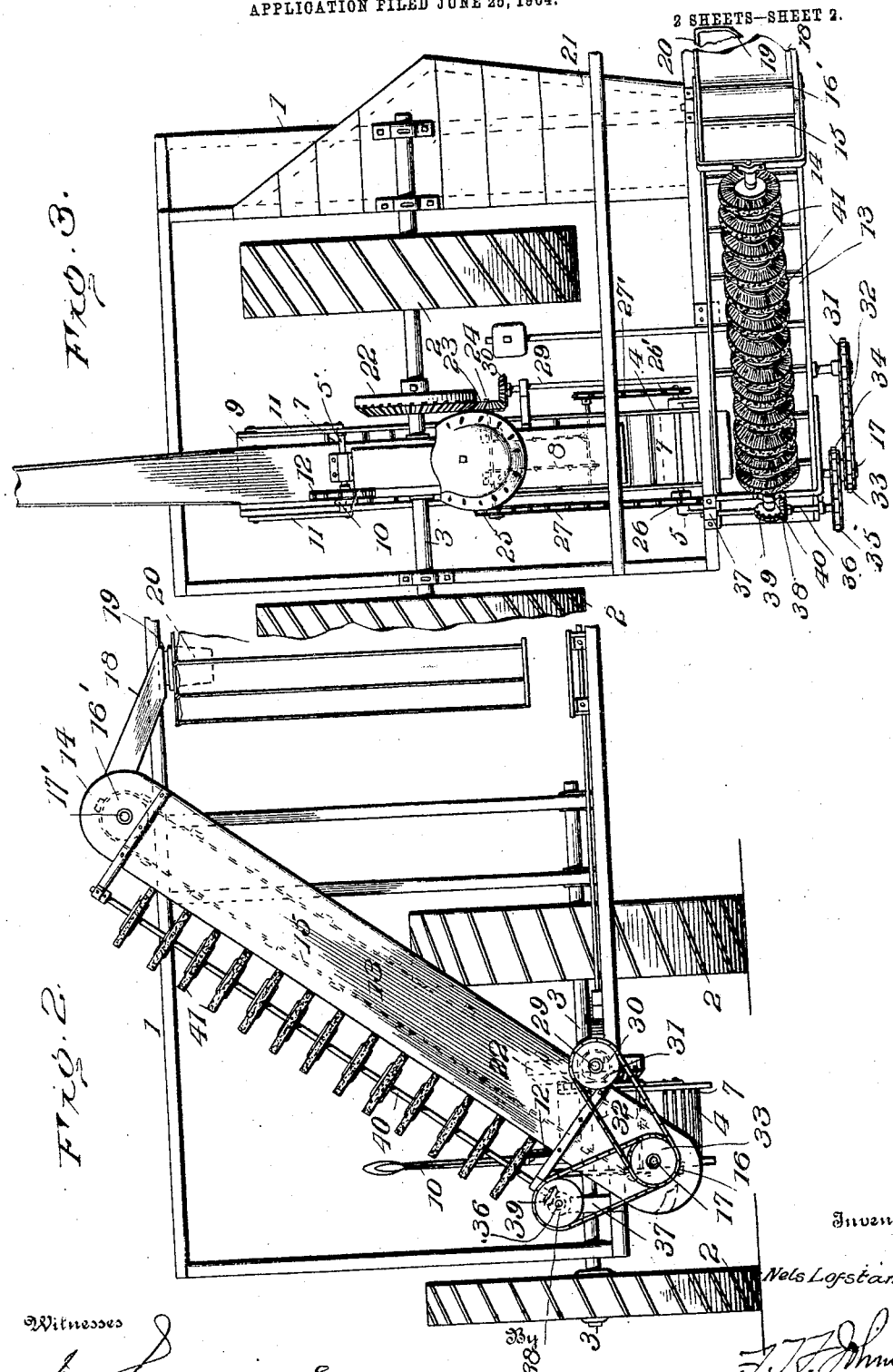

NELS LOFSTAM, OF DETROIT CITY, MINNESOTA.

POTATO-HARVESTER.

No. 799,911. Specification of Letters Patent. Patented Sept. 19, 1905.

Application filed June 25, 1904. Serial No. 214,180.

*To all whom it may concern:*

Be it known that I, NELS LOFSTAM, a citizen of the United States, residing at Detroit City, in the county of Becker and State of Minnesota, have invented new and useful Improvements in Potato-Harvesters, of which the following is a specification.

This invention relates to improvements in machines for harvesting potatoes and other vegetables that grow beneath the surface of the ground; and it consists, essentially, in the novel construction, arrangement, and combination of the several parts of the device, as hereinafter fully described, illustrated in the drawings, and more particularly pointed out in the claims hereunto appended.

The principal object of the invention is to dig the vegetables from the ground and carry them to a point where they may be placed in suitable receptacles and while so doing to remove clods, dirt, stones, weeds, and vines and such other material as may be gathered up with the vegetables.

In the drawings, Figure 1 represents a side elevation of my improved harvester. Fig. 2 is a rear elevation thereof, and Fig. 3 is a top plan view of the same.

Referring to the several views, the numeral 1 indicates the frame or body of the machine, and 2 2 the wheels thereof, mounted on a revoluble axle or shaft 3. Below the body or frame, between the wheels 2 2, is a suitable digger 4, pivoted near its rear end to the under side of said body or frame 1. Journaled in the respective ends of the digger are revoluble shafts 5 5', upon which are mounted drums 6 6', over which passes an endless skeleton drag 7. Located in the digger between the drums 6 6' and to the inside of the said drag 7 is a suitable shaker or vibrator 8, which is designed to so shake or vibrate said drag that the dirt carried thereby will be caused to fall therefrom and pass back to the ground.

The point 9 of the digger is lowered to an operating or digging position and raised therefrom by means of the angle-lever 10 and the link 11, connecting said lever with the digger, as shown in Fig. 1. By this means the digger may be set to any desired depth or raised entirely from the ground and held in such position by means of the rack 12, secured to the frame of the machine. It is obvious that by pushing the lever 10 forward the end of the digger will be lowered and that by pulling it back the digging end will be raised.

The numeral 13 indicates an inclined elevator, which is located at the rear of the machine, and which has its lower end set beneath the rear end of the digger 4 and the endless drag therein. This elevator consists of a suitable casing 14, open on the top, and an endless skeleton belt or carrier 15, passing over drums 16 16', mounted on shafts 17 17', journaled in the respective ends of the casing. The upper end of the casing 14 extends over a downwardly-inclined assorting table or chute 18 for the purpose of delivering the vegetables to the desired receptacle. The lower end of this table or chute is contracted and has a suitable opening 19 in the bottom thereof, which opening is provided with a downwardly-swinging gate or valve 20, adapted to close said opening to prevent the vegetables passing therethrough.

The numeral 21 indicates a suitable platform on the frame or body of the machine on which a person may stand to assort the vegetables as they are thrown onto the assorting-table from the elevator.

The numeral 22 indicates a suitable gear-wheel rigidly mounted on the shaft or axle 3, which meshes with a gear-wheel 23 on a shaft 24, mounted in suitable bearings in the frame of the machine. The outer end of the shaft 24 is provided with a sprocket-wheel 25, which drives a sprocket-wheel 26, secured on one end of the shaft 5 in the digger, through a chain 27. The opposite end of the shaft 5 is also provided with a suitable sprocket-wheel 26', which through the chain 27' operates the shaker or vibrator 8.

Suitably mounted in the frame 1 is a shaft 29, having at its inner end a beveled pinion 30, meshing with the gear-wheel 23, and at its outer end a sprocket-wheel 31, adapted to operate, through a suitable chain 32, a sprocket-wheel 33, secured on the outer end of the shaft 17 in the lower end of the elevator.

The numeral 34 indicates a sprocket-wheel, also mounted on the shaft 17 and which is connected with a suitable sprocket-wheel 35, mounted on a revoluble shaft 36, journaled in bearings in brackets 37, secured to the elevator-casing. Mounted on the shaft 36 is a beveled gear-wheel 38, meshing with a similar gear-wheel 39 on one end of a revoluble shaft 40, journaled in suitable brackets at the respective ends of the elevator-casing. The shaft 40 is located above the skeleton belt or carrier 15 and longitudinally thereof and is provided with a series of brushes 41 for the purpose of removing weeds, vines, &c., from the vegetables as they are carried up said elevator.

The operation will be apparent without further description.

Having thus fully described my invention, what I claim, and desire to secure by Letters Patent, is—

1. In a harvester of the character described, the combination with the truck, an inclined elevator-casing carried thereby, a drum mounted in the upper end of said casing, a revoluble shaft mounted in the lower end of said casing and a drum carried thereby, an endless skeleton carrier mounted on said drums and adapted to travel longitudinally of said casing, a shaft mounted in said truck having one end geared with the axle thereof and the opposite end carrying a sprocket, a sprocket on the drum-shaft, and a chain connecting said sprockets, whereby motion is communicated from the wheels of the truck to the endless carrier to operate the same, of a revoluble shaft mounted on said casing above said endless carrier, parallel therewith and longitudinally thereof, a gear on the lower end of said revoluble shaft, a series of brushes mounted on said shaft, a shaft mounted on said casing having at one end a gear adapted to mesh with the gear on the end of the revoluble shaft and at its opposite end a sprocket, a sprocket on the drum-shaft, and a chain connecting said sprockets, whereby a rotary motion is communicated to said brushes from the drum-shaft when the skeleton carrier is operated.

2. In a harvester of the character described, the combination with the truck, an inclined elevator-casing carried thereby, a drum mounted in the upper end of said casing, a revoluble shaft mounted in the lower end of said casing and a drum carried thereby, an endless skeleton carrier mounted on said drums and adapted to travel longitudinally of said casing, a gear rigidly mounted on the axle of said truck, a revoluble shaft mounted in said truck having a gear at one end connected with the gear on the truck-axle and the opposite end carrying means connected with the drum-shaft, whereby motion is communicated from the wheels of the truck to the endless carrier to operate the same, of a revoluble brush arranged above said skeleton carrier, longitudinally thereof and parallel therewith, and means connecting said brush and drum-shaft, whereby said brush is revolved from the drum-shaft synchronously with the operation of the skeleton carrier.

In testimony whereof I have signed my name to this specification in the presence of two subscribing witnesses.

NELS LOFSTAM.

Witnesses:
W. W. ROSSMAN,
G. T. SMITH.